(12) United States Patent
Henry et al.

(10) Patent No.: US 7,574,969 B1
(45) Date of Patent: Aug. 18, 2009

(54) PRECISION HOE OPENER AND PACKER WHEEL ASSEMBLY

(75) Inventors: Jim Henry, Saskatoon (CA); Barry Pomedli, Saskatoon (CA); Gerard James Gadzella, Saskatoon (CA)

(73) Assignee: CNH Canada, Ltd. (CA)

( * ) Notice: Subject to any disclaimer, the term of this patent is extended or adjusted under 35 U.S.C. 154(b) by 0 days.

(21) Appl. No.: 12/141,881

(22) Filed: Jun. 18, 2008

(51) Int. Cl.
*A01C 5/00* (2006.01)
*A01C 13/00* (2006.01)
*B21D 53/60* (2006.01)
*B21K 19/00* (2006.01)

(52) U.S. Cl. .................. 111/152; 111/194; 111/900; 29/891

(58) Field of Classification Search ............ 172/1, 172/138, 141, 174–176, 179, 195–197, 199, 172/200, 238–244, 260.5, 261–268, 297–299, 172/303, 304, 307–310, 315–322, 332–337, 172/395, 407–421, 452–507, 605, 663–684.5, 172/734–744, 776; 111/194, 196, 190, 191, 111/52–62, 149, 151–156, 120–126, 200, 111/900; 29/891
See application file for complete search history.

(56) References Cited

U.S. PATENT DOCUMENTS

| | | | |
|---|---|---|---|
| 1,931,783 A | 10/1933 | Wickes | |
| 2,637,797 A | 2/1953 | Acton | |
| 2,818,269 A * | 12/1957 | Northcote et al. | ........ 280/414.5 |
| 2,839,851 A | 6/1958 | Geiszler | |
| 3,599,728 A | 8/1971 | Moe et al. | |
| 4,326,594 A | 4/1982 | Oka et al. | |
| 4,580,507 A | 4/1986 | Dreyer et al. | |
| 4,694,759 A * | 9/1987 | Dreyer et al. | ............ 111/151 |
| 4,721,048 A | 1/1988 | Fuss et al. | |
| 4,759,301 A | 7/1988 | Thomas | |
| 5,031,550 A | 7/1991 | Neal | |
| 5,161,472 A | 11/1992 | Handy | |
| 5,234,060 A | 8/1993 | Carter | |
| 5,351,635 A | 10/1994 | Hulicsko | |
| 5,396,851 A * | 3/1995 | Beaujot | ................ 111/187 |
| 5,855,245 A * | 1/1999 | Gerein | ................ 172/328 |
| 6,032,593 A | 3/2000 | Wendling et al. | |

(Continued)

FOREIGN PATENT DOCUMENTS

AU    58706/86    12/1986

(Continued)

OTHER PUBLICATIONS

Voichinskii, S.M.; Agricultural Implement depth controller; Derwent Abstract Accession No. B4505B/07, Class P11, SU 599755 A (Minsk Tractor Wks) Apr. 19, 1978; abstract drawings.

(Continued)

*Primary Examiner*—Christopher J. Novosad
(74) *Attorney, Agent, or Firm*—Rebecca Henkel

(57) ABSTRACT

A precision hoe opener assembly is provided with improved accuracy of seeding as well as improved control over the opener and packer wheel assemblies. The opener assembly includes a hydraulically-driven parallel linkage assembly, hoe opener, and a packer wheel. The design provides improved seeding accuracy, especially during changes in terrain elevation.

22 Claims, 4 Drawing Sheets

U.S. PATENT DOCUMENTS

| | | | |
|---|---|---|---|
| 6,142,085 | A | 11/2000 | Drever et al. |
| 6,986,313 | B2 | 1/2006 | Halford et al. |
| 7,104,205 | B2 * | 9/2006 | Beaujot .................. 111/141 |
| 7,152,539 | B2 | 12/2006 | Swanson |
| 7,159,523 | B2 | 1/2007 | Bourgault et al. |
| 7,168,376 | B2 | 1/2007 | Johnston |
| 7,261,048 | B1 * | 8/2007 | Hantke .................... 111/56 |
| 2007/0245938 | A1 * | 10/2007 | Bourgault et al. ......... 111/156 |
| 2008/0029002 | A1 | 2/2008 | Sulman |
| 2008/0308024 | A1 | 12/2008 | Lung et al. |

FOREIGN PATENT DOCUMENTS

| | | |
|---|---|---|
| FR | 2630286 | 10/1989 |

OTHER PUBLICATIONS

U.S. Appl. No. 12/141,891, filed Jun. 18, 2008; Applicants: Nicholas George Alfred Ryder et al.; Entitled: Precision Hoe Opener with Swing Link Between Cylinder and Shank.

U.S. Appl. No. 12/141,895, filed Jun. 18, 2008; Applicants: Nicholas George Alfred Ryder et al.; Entitled: "Precision Hoe Opener Assembly with Swing Link and Biasing Member".

U.S. Appl. No. 12/141,904, filed Jun. 18, 2008; Applicants: Nicholas George Alfred Ryder et al.; Entitled: "Precision Hoe Opener Assembly with Adjustable Packer Wheel Location".

U.S. Appl. No. 12/141,908, filed Jun. 18, 2008; Applicants: Nicholas George Alfred Ryder et al.; Entitled: "Precision Hoe Opener with Draft Force Compensation".

* cited by examiner

PRECISION HOE OPENER AND PACKER WHEEL ASSEMBLY

BACKGROUND

The invention relates to agricultural planters, such as hoe openers and seeding tools used in farming operations to distribute seeds into soil. Generally, openers are towed behind a tractor via a mounting bracket secured to a rigid frame of the tractor. These openers may include a ground engaging tool or opener that forms a seeding path for seed deposition into the soil. The ground opener is used to break the soil to enable seed deposition. After the seed is deposited, the opener may be followed by a packer wheel that packs the soil on top of the deposited seed. The packer wheel may be rigidly mounted behind the opener via a structural member or rear frame. Thus, the opener and packer wheel generally move together with the same upward and downward motion.

Unfortunately, existing openers do not adequately address the need to accommodate height variation over terrain during seeding or transportation without seeding. It is generally undesirable to pull the hoe opener through soil when merely transporting the opener from one location to another. In addition, during seeding, existing openers do not provide adequate vertical motion of the opener and related assembly without compromising the load on the opener and packer wheel. As a result, variations in the terrain can result in substantial changes in the packing force (e.g., normal force) of the packer wheel on the terrain being seeded by the opener and the draft force of the terrain on the opener. The variable force on the opener can result in loss of control over seeding depth. More specifically, this variation in packing and opener force can result in non-uniform seeding depths and packing density in the terrain being seeded by the planter.

Existing openers also require substantial force to raise the planter row unit, including the opener assembly and packing wheel. This results in the use of large hydraulic cylinders to raise the apparatus, due to the overall length and weight of each planter row unit. This hydraulic equipment is costly and takes resources (i.e. hydraulic power) from other portions of the tractor and planter unit.

There is a need, therefore, for improved arrangements in precision hoe openers and planters that improve accuracy of the seeding operation. There is a particular need for planters and openers that apply forces to the opener and the packing wheel to improve seeding depth and accuracy.

BRIEF DESCRIPTION

The present invention provides a novel configuration for precision hoe opener assemblies. This configuration of the opener assembly provides improved accuracy of seeding as well as improved control over the opener and packer wheel assemblies. In an exemplary embodiment, the opener assembly includes a hydraulically-driven parallel linkage assembly. The parallel linkage is coupled to the hoe opener and the packer wheel, and is configured to apply a substantially constant force in a deployed position. These features enhance seeding accuracy, especially during changes in the elevation of terrain. In addition, the configuration enables the hydraulic cylinder to raise the hoe opener and the packer wheel above the ground. The design may be implemented for agricultural planters as well as other implements or applications requiring control of height and/or force of implements.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
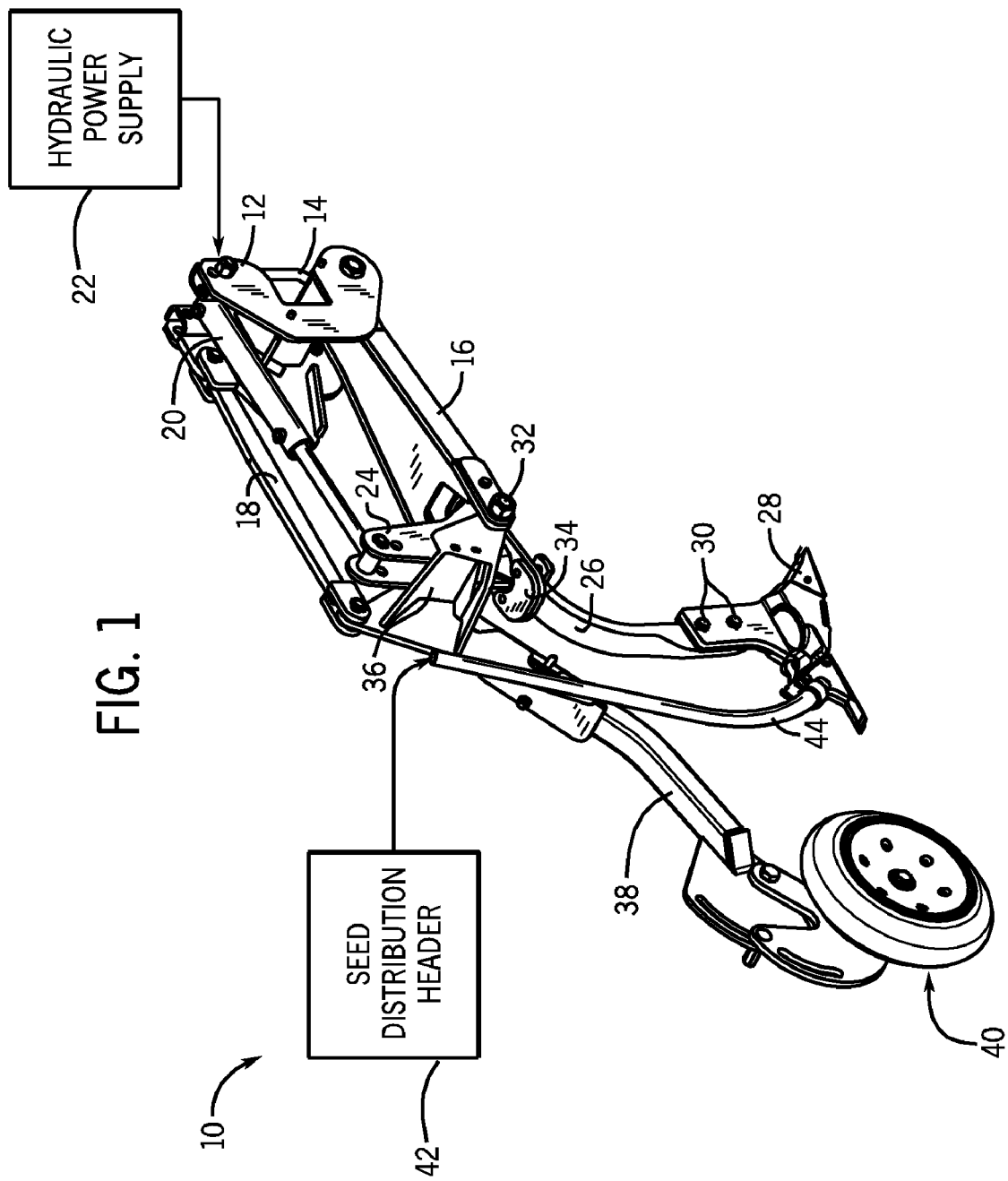
FIG. 1 is a perspective view of a precision hoe opener assembly in accordance with aspects of the invention, including an opener, a packer wheel, and a parallel linkage assembly.

Turning now to the drawings and referring first to FIG. 1, an embodiment of a precision hoe opener assembly is illustrated and designated generally by reference numeral 10. As will be appreciated by those skilled in the art, hoe opener assembly 10 is a type of row unit, which may be placed on an agricultural implement, such as a planter. Precision opener assembly 10 includes a frame support 12, mounting brackets 14, first member 16, second member 18, and a linear actuator such as a cylinder 20 (e.g., hydraulic and/or pneumatic piston-cylinder assembly). Cylinder 20 may be hydraulically coupled to a power supply 22 that is used to provide a flow of pressurized hydraulic fluid that displaces a piston rod extending from the cylinder. Precision hoe opener assembly 10 may be towed, or generally moved by a vehicle, such as a tractor. For example, the frame support 12 and frame bracket 14 may interface tool frame tow bar connected to the tractor (not shown) for towing the precision hoe opener assembly 10. For instance, a plurality of opener assemblies 10 may be mounted in parallel along a tool frame bar to comprise a planter unit. Elements 12, 16, 18, 36 and 20 may be collectively described as components of a hydraulically driven parallel linkage assembly. The parallel linkage assembly may also be referred to as a four bar linkage. As will be appreciated by those skilled in the art, components of opener assembly 10, such as frame support 12, mounting brackets 14, first member 16, and second member 18, may be made of any suitable material, such as steel or an alloy.

Cylinder 20 is attached to a shank adapter 24 via a pin at the end of the piston rod. The shank adapter 24 is also coupled to shank 26 and opener 28. Shank adapter 24 may be coupled to shank 26 via fasteners 30, which allow height adjustments of opener 28, enabling a variable seeding depth for the opener assembly. Pin 32 is coupled to first member 16 and shank adapter 24, allowing shank adapter 24 to pivotally rotate about the pin 32 as cylinder 20 extends and retracts. Accordingly, opener 28 moves downward or upward based upon cylinder 20's extension or retraction, respectively. Shank adapter 24 may feature several holes to receive a pin coupling the end of cylinder 20 to the adapter. The adapter holes may be used to adjust the angle of cylinder 20 with respect to the parallel linkage assembly, thereby changing the angle and magnitude of cylinder forces.

As cylinder 20 retracts, stop plate 34 may press on rear frame 36, creating a lifting force that is conveyed to packer wheel assembly 38. The resulting lifting force, caused by cylinder 20, reduces the packing force of wheel 40 and may eventually lift packing wheel 40 from the terrain. In the embodiment, packer wheel assembly may allow height adjustment of packer wheel 40, in the form of fastener and slot or an equivalent structure. In some cases, the resulting lifting force may compensate for an increased packing force, caused by terrain elevation changes, thereby increasing seeding accuracy. To facilitate seed deposition during operation, opener 28 is coupled to a seed distribution header 42 via a seeding tube 44.

Figure 2:
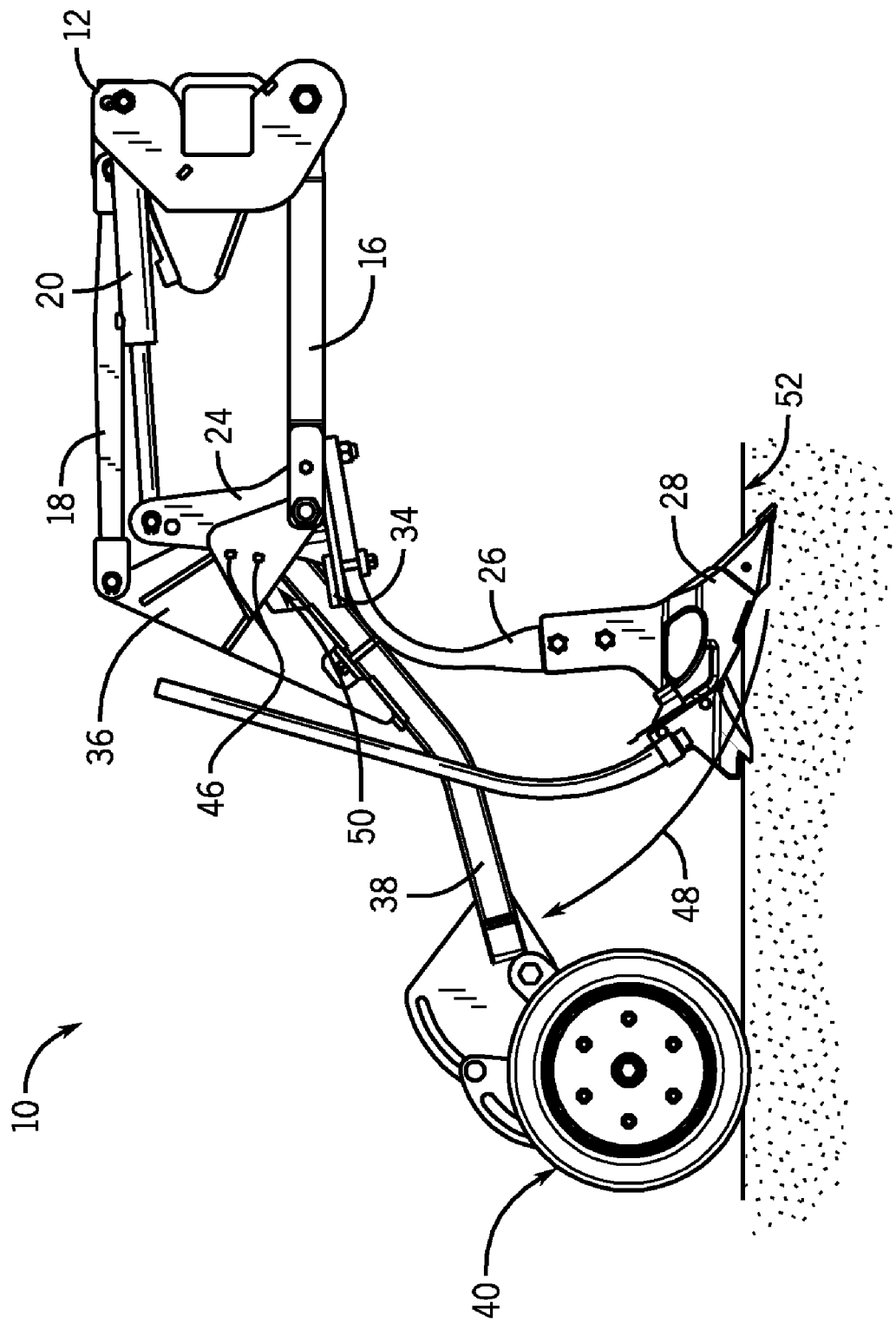
FIG. 2 is a side view of the opener assembly of FIG. 1, showing the opener implement and packer wheel assemblies in a deployed position.

FIG. 2 illustrates a side view of an embodiment of the precision hoe opener 10. The figure illustrates the precision hoe opener 10 in a neutral position on generally level terrain. Further, as the terrain elevation fluctuates, the hoe opener position will move upward or downward from the neutral position. Cylinder 20 is extended, thereby deploying the opener 28 downward into the terrain, pressing shank adapter 24 against rear frame stops 46. In the present context, the deployed position may be used to describe the precision hoe opener 10 in a ground-engaging, working position where the shank adapter 24 is pressed against rear frame stops 46 and opener 28 is engaged with the terrain. For example, while in a deployed position the opener 10 may vertically travel up to eight inches as the opener 28 goes over and maintains contact with the contours of a terrain. During sharp changes in elevation, the opener 28 is maintained at a substantially constant angle with the terrain by the parallel linkage and the expansion and contraction of cylinder 20. In this deployed position, cylinder 20 also exerts a downward force on packer wheel 40. When cylinder 20 retracts, opener 28 is lifted from the deployed position, as indicated by arrow 48. When in the fully retracted position, stop plate 34 presses against contact surface 50, lifting packer wheel 40 upward. As the opener assembly 10 retracts fully, opener 28 and packer wheel 40 are lifted from terrain 52. The fully retracted position may be utilized when transporting the planter between fields, to minimize wear and tear of the opener.

As will be appreciated by one skilled in the art, the configuration of shank adapter 24, first member 16 and rear frame 36 allows the actuator to pivotally move shank 26 and opener 28 through an angular range independently of packer wheel assembly. That is, in the range of motion between stop plate 34 and rear frame stops 46, shank adapter 24 and cylinder 20 cause only movement of the opener 28. In the embodiment, while the opener 28 and actuator 20 are in this "independent" range of motion, the precision hoe opener may not be in a deployed position, i.e. the opener 28 may be removed from contact with the ground. Further, this movement of the opener 28 directly changes the angle between opener 28 and the terrain. In contrast, when in a deployed position, the opener 28 and the terrain are maintained at a substantially constant angle by the parallel linkage assembly. The arrangement may also be helpful as the hoe opener 10 encounters large clods or trash and the actuator 20 is retracted, the shank adapter is released from contact with the frame stops 46, lifting opener 28, thereby reducing wear or damage that may be caused by such impediments.

Figure 3:
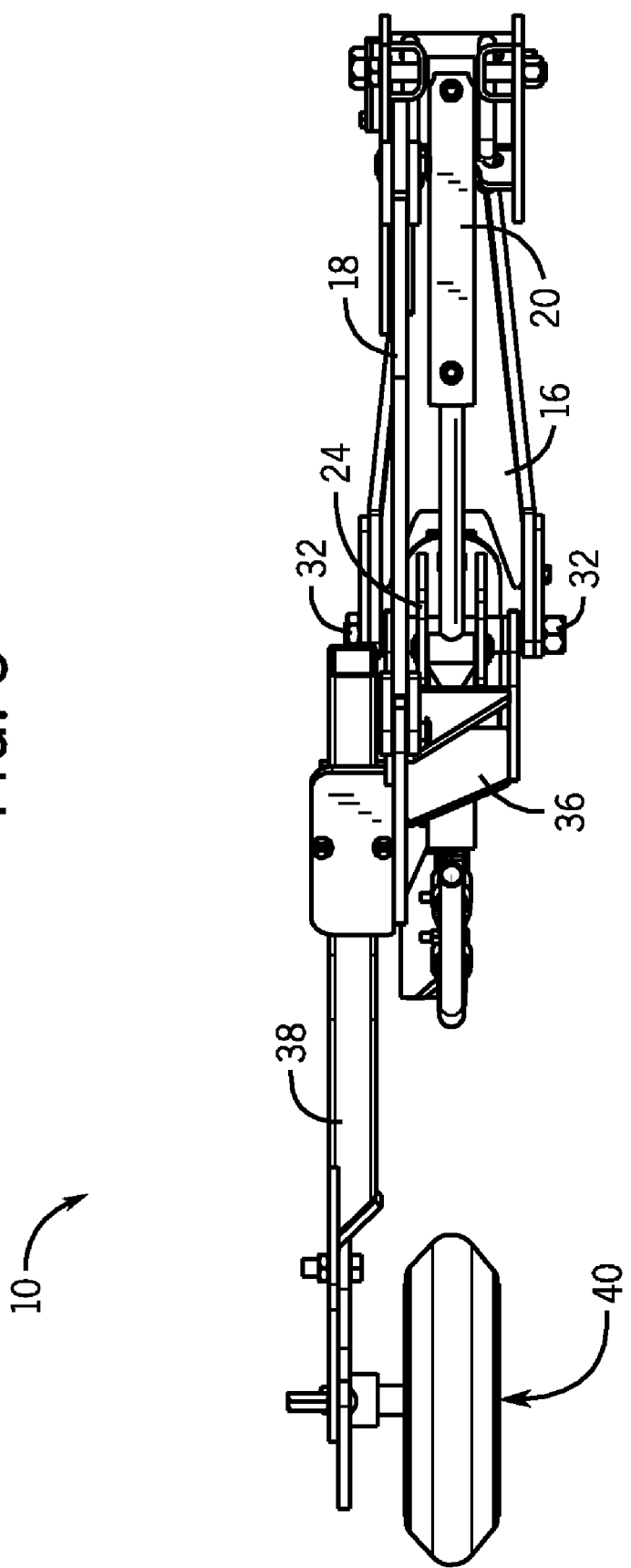
FIG. 3 is a top view of the opener assembly from FIGS. 1 and 2.

A top view of the precision hoe opener assembly 10 is illustrated in FIG. 3. The figure shows cylinder 20, first member 16, second member 18, shank adapter 24, and rear frame 36. The embodiment illustrates that pin 32 is used to couple and control movement of many components of opener assembly 10, including first member 16, rear frame 36, and shank adapter 24. The view also illustrates that packer wheel assembly 38 places packer wheel 40 directly behind the opener 28.

Referring back to FIG. 2, the opener assembly 10 and opener 28 are depicted in a deployed position. During normal operation in a deployed position, opener 28 may break through terrain 52 creating a draft force on opener 28. In this deployed position, a cylinder load is directed along the cylinder 20 and cylinder rod to shank adapter 24, manipulating packer wheel 40 and opener 28 with a generally constant downward force. In particular, the geometry of the illustrated parallel linkage, including first member 16, second member 18, frame support 12, and rear frame 12, results in a generally constant downward force on opener 28 and packer wheel 40 as the terrain elevation fluctuates.

In general, the drawing illustrates that the precision opener assembly 10 has an increased range of motion providing a generally constant packing force to the soil. This is achieved in part by the opener assembly 10 maintaining a substantially constant angle between packer wheel assembly 38 and terrain 52. In addition, the geometry of the hydraulically driven parallel linkage assembly, including elements 12, 16, 18, and 20, allows the opener assembly to maintain the substantially constant packing force and the substantially constant orientation with respect to the terrain.

As will be appreciated by those skilled in the art, the disclosed embodiments of precision opener 10 provide control of the packing force and the seeding depth by controlling opener 28 and packing wheel 40. The opener 10 advantageously responds to variations in the terrain, draft force on the opener 28, the packing force, or a combination thereof. Thus, the opener 10 can provide a generally uniform packing force and seeding depth to improve the overall quality of the seeding process, and in turn improve subsequent growth originating from the seeds. Again, the hoe opener 10 has a variety of adjustment mechanisms to control the location of the packer wheel 40, the opener 28, or a combination thereof.

Figure 4:
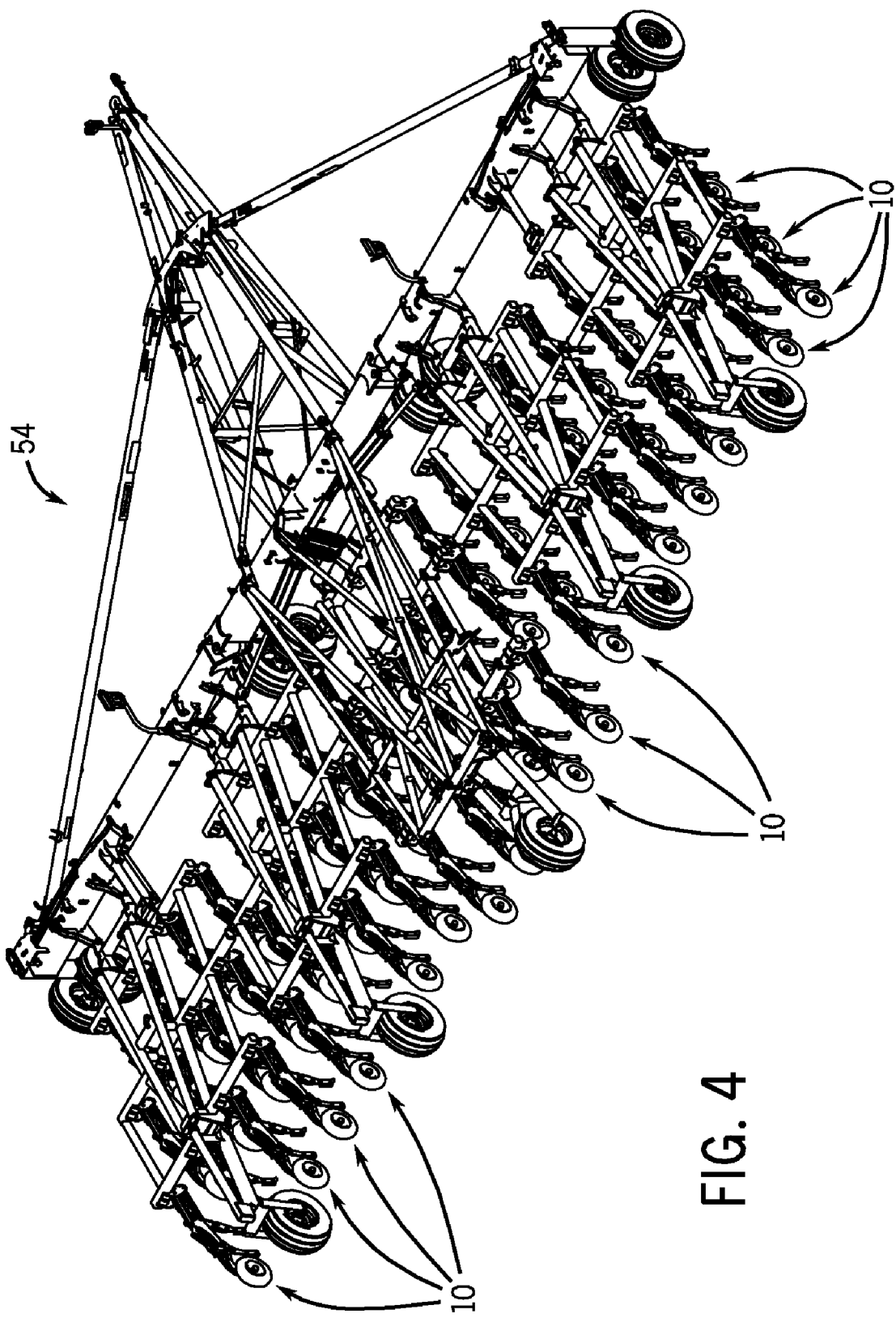
FIG. 4 is a perspective view of an entire planter assembly system, including multiple opener assemblies and the tool bars that they are attached thereto.

FIG. 4 illustrates the agricultural implement assembly, including a plurality of precision opener assemblies 10, as row units of a complete agricultural planter system 54, as may be towed behind a tractor (not shown).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural planter system comprising:
   a support structure comprising a parallel linkage assembly and a linear actuator separate from the parallel linkage;
   a packer wheel assembly extending from the parallel linkage assembly, wherein the parallel linkage assembly is configured to maintain a constant orientation of the packer wheel assembly with respect to the ground; and
   an opener assembly coupled to the support structure, wherein the linear actuator is configured to maintain a generally constant angle with respect to the parallel linkage assembly when the opener assembly is in a deployed position;
   wherein the opener assembly is rigidly coupled to an adapter assembly and the linear actuator is configured to move the opener assembly independent of the packer wheel assembly; and
   wherein the parallel linkage assembly and the linear actuator are configured to cooperatively apply a generally constant packing force to the packer wheel assembly.

2. The system of claim 1, wherein the parallel linkage assembly comprises a four bar linkage.

3. The system of claim 1, wherein the parallel linkage assembly is coupled to a planter frame and is configured to maintain a constant orientation of the opener assembly with respect to the planter frame.

4. The system of claim 1, wherein the linear actuator is coupled to an adapter assembly that is rigidly coupled to the opener assembly and is configured to raise and lower the opener assembly by pivotal movement.

5. The system of claim 4, wherein the packer wheel assembly is raised by contact with the adapter assembly.

6. The system of claim 4, wherein the linear actuator raises the packer wheel assembly after a predetermined pivotal movement of the adapter assembly.

7. The system of claim 4, wherein the extension and retraction of the linear actuator directly moves the opener assembly.

8. The system of claim 1, wherein the linear actuator is configured to move the opener assembly independent of the packer wheel assembly between extremities of the pivotal movement of the adapter assembly.

9. An agricultural planter system comprising a plurality of row units, each configured as set forth in claim 1.

10. The system of claim 1, wherein the linear actuator is positionable in a plurality of angular positions with respect to the parallel linkage assembly.

11. An agricultural planter system comprising:
a support structure comprising a parallel linkage assembly and a linear actuator separate from the parallel linkage;
a packer wheel assembly extending from the parallel linkage assembly, wherein the parallel linkage assembly and the linear actuator are configured to cooperatively apply a generally constant packing force to the packer wheel assembly; and
an opener assembly coupled to the support structure, wherein the support structure comprises a linear actuator configured to maintain a generally constant angle with respect to the parallel linkage assembly when the opener assembly is in a deployed position;
wherein the opener assembly is rigidly coupled to an adapter assembly and the linear actuator is configured to move the opener assembly independent of the packer wheel assembly.

12. The system of claim 11, wherein the linear actuator is coupled to the adapter assembly, wherein the adapter assembly is coupled to the opener assembly and is configured to raise and lower the opener assembly by pivotal movement.

13. The system of claim 12, wherein the packer wheel assembly is raised by contact with the adapter assembly.

14. The system of claim 12, wherein the linear actuator raises the packer wheel assembly after a predetermined pivotal movement of the adapter assembly.

15. The system of claim 12, wherein the extension and retraction of the linear actuator directly moves the opener assembly.

16. The system of claim 12, wherein the linear actuator is configured to move the opener assembly independent of the packer wheel assembly between extremities of the pivotal movement of the adapter assembly.

17. An agricultural planter system comprising:
a support structure comprising a parallel linkage assembly and a linear actuator separate from the parallel linkage;
a packer wheel assembly extending from the parallel linkage assembly; and
an opener assembly coupled to the support structure, wherein the linear actuator is configured to maintain a generally constant angle with respect to the parallel linkage assembly when the opener assembly is in a deployed position, wherein the extension and retraction of the linear actuator directly moves the opener assembly;
wherein the opener assembly is rigidly coupled to an adapter assembly and the linear actuator is configured to move the opener assembly independent of the packer wheel assembly; and
wherein the parallel linkage assembly and the linear actuator are configured to cooperatively apply a generally constant packing force to the packer wheel assembly.

18. The system of claim 17, wherein the adapter assembly is configured to raise and lower the opener assembly by pivotal movement and wherein the packer wheel assembly is raised by contact with the adapter assembly.

19. The system of claim 18, wherein the linear actuator raises the packer wheel assembly after a predetermined pivotal movement of the adapter assembly.

20. The system of claim 18, wherein the linear actuator is configured to move the opener assembly independent of the packer wheel assembly between extremities of the pivotal movement of the adapter assembly.

21. The system of claim 17, wherein the parallel linkage assembly is configured to maintain a constant orientation of the packer wheel assembly with respect to the ground.

22. A method of manufacturing an agricultural planter system, the method comprising:
mounting an opener assembly to extend from a support structure;
mounting a packer wheel assembly to extend from the support structure;
mounting a parallel linkage assembly on the support structure, wherein the support structure comprises a linear actuator separate from the parallel linkage, wherein the linear actuator is configured to maintain a generally constant angle with respect to the parallel linkage assembly when the opener assembly is in a deployed position; and
coupling the opener assembly to an adapter assembly, wherein the linear actuator is configured to move the opener assembly independent of the packer wheel assembly;
wherein the parallel linkage assembly and the linear actuator are configured to cooperatively apply a generally constant packing force to the packer wheel assembly.

* * * * *